United States Patent [19]
Kelley

[11] Patent Number: 5,274,029
[45] Date of Patent: Dec. 28, 1993

[54] STYRENE POLYMERIZATION PROCESS

[76] Inventor: Joseph M. Kelley, 1321 E. Broad St., Westfield, N.J. 07090

[21] Appl. No.: 799,003

[22] Filed: Nov. 25, 1991

Related U.S. Application Data

[63] Continuation of Ser. No. 580,205, Sep. 10, 1990, abandoned.

[51] Int. Cl.$^5$ ................................................ C08F 4/32
[52] U.S. Cl. .................................... 525/53; 525/261; 525/263; 525/265; 525/313; 525/316; 526/65; 526/224; 526/228; 526/346; 526/347.2
[58] Field of Search ................. 526/65, 228, 224, 346, 526/347.2; 525/53, 261, 263, 265, 313, 316

[56] References Cited

U.S. PATENT DOCUMENTS

| | | | |
|---|---|---|---|
| 2,656,334 | 10/1953 | D'Alelio | 526/228 |
| 4,042,768 | 8/1977 | Müller et al. | 526/65 |
| 4,129,703 | 12/1978 | Kamath et al. | 526/228 |
| 4,314,041 | 2/1982 | Shimokawa et al. | 525/53 |
| 4,612,355 | 9/1986 | Belz | 526/65 |
| 4,948,847 | 8/1990 | Morita et al. | 526/65 |

Primary Examiner—Joseph L. Schofer
Assistant Examiner—R. H. Delmendo
Attorney, Agent, or Firm—Shea & Gould

[57] ABSTRACT

An improved process for the polymerization of styrene is provided. The process comprises feeding styrene monomer and a mixture of peroxides, which decompose at progressively higher temperatures, into a prepolymerization vessel maintained at 200°–270° F. About 20–40% of the styrene in this vessel is converted to polymer (depending on temperature and residence time) and then fed to an extruder where the polymer is raised in temperature by passage through a heat exchanger or through the heated throat of the extruder. During this heating, the polymerization is completed in seconds to minutes in an extruder as the peroxides decompose in sequence as the temperature rises. A final devolatilization zone is provided to remove the final traces of monomer. The molten polymer is then passed through a die and stranded or hot die face cut. In like manner, this process can be used to produce styrene-acrylonitrile copolymers by the addition, prior to prepolymerization, of acrylonitrile to the prepolymerization vessel, impact polystyrene by the addition of rubber to the styrene in a dissolver and ABS by the addition of rubber and acrylonitrile to the styrene in a dissolver prior to prepolymerization.

26 Claims, 2 Drawing Sheets

STYRENE POLYMERIZATION PROCESS

This is a continuation of co-pending application Ser. No. 580,205, filed on Sep. 10, 1990, now abandoned.

BACKGROUND OF THE INVENTION

1. Field of the Invention

The present invention relates to the production of styrene polymers, copolymers, and graft copolymers. More particularly, the present invention relates to a two stage process for the production of crystal polystyrene, impact polystyrene, styrene-acrylonitrile copolymers or acrylonitrile-butadiene-styrene terpolymers.

2. Description of the Prior Art

Styrene was one of the first monomers to be polymerized. There are many polymerization processes described in the literature. Some of the earliest processes involved placing styrene monomer in a drum in the sun and allowing the monomer to polymerize, removing the solid block from the drum, and crushing the block with hammers. Another labor intensive process was the polymerization of styrene in a type of filter press which had to be disassembled after the polymerization was completed.

An early process for the preparation of crystal and impact polystyrene involved a prepolymerization step using 10% of a solvent such as ethylbenzene, followed by bulk polymerization and devolatilization to remove the ethylbenzene. Without the ethylbenzene, the viscosity of the polymer was very high and it could not be moved through the reactor-heat exchanger. The added solvent increased the cost of the process due to the solvent cost and additional solvent removal step.

Other processes for the polymerization of crystal styrene included a suspension process wherein the styrene monomer was suspended in water using tricalcium phosphate into discrete small droplets which polymerized in the presence of organic peroxides to small hard beads. This process had the disadvantages of long polymerization cycles and batch instability, which on occasion caused the formation of lollipops (i.e., agglomeration of all the beads into a large blob, usually around the agitator).

Another process for producing crystal polystyrene, called the tower process, required large reactors and fairly long residence.

Acrylonitrile-butadiene-styrene (ABS) graft copolymers were normally produced by a latex process wherein the styrene and acrylonitrile monomers were grafted onto a polybutadiene rubber latex, the latex was then coagulated, and the polymer was lubricated and stabilized before being extruded into pellets. The process was expensive because of the numerous steps, the handling of the latex, and the long cycles involved.

Thus, the above prior art processes involved long cycles and/or the use of expensive and unstable suspensions and emulsions.

In the past, attempts have been made to polymerize styrene in a twin screw extruder. These attempts have failed due to the inability to feed a liquid hydrocarbon without leakage, to totally remove the heat of polymerization in the extruder, and to remove monomer and oligomer from the polymer. These problems have prevented the commercialization of a process to polymerize styrene in a twin screw extruder.

Accordingly, it is an object of the present invention to provide a novel and improved process for the polymerization of styrene including the copolymerization of styrene and other monomer(s). Another object of the invention is to provide a rapid and inexpensive process for the polymerization or copolymerization of styrene. A further object of the invention is to provide an efficient and workable process for the polymerization or copolymerization of styrene utilizing an extruder as a reactor for completion of the polymerization.

These and other objects, as well as the scope, nature and utilization of the invention will become apparent to those skilled in the art from the following description, the drawings and the appended claims.

SUMMARY OF THE INVENTION

The present invention provides a process for the preparation of styrene polymers, copolymers, and graft copolymers.

The process for preparing crystal polystyrene comprises the steps of: a) preparing a mixture by separately feeding styrene, an initiator system consisting essentially of a mixture of high temperature peroxides having different decomposition temperatures, and optionally one or more organic mercaptans to a reactor; b) prepolymerizing the styrene monomer in the mixture in a stirred reactor at a temperature of about 200° to about 270° F., preferably about 220° to 260° F., for a residence time sufficient to convert about 20% to about 40% of the styrene to a prepolymer; c) heating the prepolymer mixture from the stirred reactor by passing it through a heating zone or adding a small amount of a low temperature peroxide to raise the prepolymer mixture's temperature to a point at which the mixed peroxides begin to decompose; d) transporting the heated prepolymer mixture through a cooled extruder at a rate which allows the prepolymer to substantially completely polymerize to polymer; (e) transporting the polymer mixture to a devolatilization zone; and f) removing any residual monomer from polystyrene in the devolatilization zone. Optionally, the polystyrene is pelletized and the pellets are cooled.

The process for preparing a styrene copolymer, such as styrene-acrylonitrile, styrene-α-methyl styrene, styrene-maleic anhydride, styrene-methyl methyacrylate, or styrene-acrylic acid, and like copolymers comprises the steps of: a) preparing a mixture by separately feeding styrene, at least one comonomer (e.g., acrylonitrile), an initiator system consisting essentially of a mixture of high temperature peroxides having different decomposition temperatures, and optionally one or more organic mercaptans to a reactor; b) prepolymerizing the styrene and comonomer(s) in the mixture in the stirred reactor at a temperature sufficient to initiate and maintain polymerization (e.g., about 200° to about 270° F., preferably about 200° to about 230° F.) for residence time sufficient to convert about 20% to about 40% of the styrene and comonomer(s) to a prepolymer; c) passing the prepolymer mixture through a heating zone to raise the prepolymer mixture's temperature to a point at which the mixed peroxides begin to decompose; d) transporting the heated prepolymer mixture through a cooled extruder at a rate which allows the prepolymer to substantially completely polymerize to polymer; (e) transporting the polymer mixture to a devolatilization zone; and e) removing any residual monomers from the copolymer mixture in the devolatilization zone. Optionally, the copolymer (e.g., styrene-acrylonitrile copolymer) is pelletized and the copolymer pellets are cooled.

The process for the production of impact polystyrene comprises the steps of: a) preparing a mixture by separately feeding a solution of rubber (e.g., cis-polybutadiene rubber) in styrene monomer, an initiator system consisting essentially of a mixture of high temperature peroxides having different decomposition temperatures, and optionally one or more organic mercaptans to a stirred tank reactor; b) prepolymerizing the mixture in the stirred reactor at a temperature sufficient to initiate and maintain polymerization (e.g., about 200° to about 270° F., preferably about 220° to 240° F.) for a residence time sufficient to convert about 20% to about 30% of the mixture to a prepolymer so that phase inversion of the rubber occurs; c) heating the prepolymer mixture from the stirred reactor to raise the prepolymer mixture's temperature to a point at which the mixed peroxides begin to decompose; d) transporting the heated prepolymer mixture through a cooled extruder at a rate which allows the prepolymer to substantially completely polymerize to polymer; (e) transporting the polymer mixture to a devolatilization zone; f) removing any residual monomer from the polymer mixture in the devolatilization zone. Optionally, the impact polystyrene is pelletized and the pellets are cooled.

The process for the production of acrylonitrile-butadiene-styrene (ABS) graft copolymer comprises the steps of: a) forming a mixture by feeding to a stirred reactor equipped with a very high shear agitation system a solution of rubber (e.g., cis-polybutadiene rubber) dissolved in styrene and acrylonitrile monomers, an initiator system consisting essentially of a mixture of high temperature peroxides having different decomposition temperatures, and optionally one or more organic mercaptans to control the rubber particle size and polymer molecular weight; b) prepolymerizing the mixture in the stirred reactor at temperature sufficient to initiate and maintain polymerization (e.g., about 200° to about 240° F., preferably about 215° to about 230° F.) for a residence time sufficient to convert about 20 to about 30% of the monomers to prepolymer so that phase inversion of the rubber occurs; c) heating the prepolymer mixture from the stirred reactor to raise the temperature of the prepolymer-rubber mixture to a temperature at which the mixed peroxides begin to decompose; d) transporting the heated prepolymer-rubber mixture through a cooled extruder at a rate which allows the prepolymer to substantially completely polymerize to polymer; (e) transporting the polymer mixture into a devolatilization zone; and f) removing any residual monomers from the polyer mixture in the devolatilization zone. Optionally, the graft polymer is pelletized and the pellets are cooled.

In the above processes, the prepolymerization step may be a thermal prepolymerization carried out at the indicated temperatures or a catalyzed prepolymerization carried out at lower temperatures using a low temperature peroxide (e.g., benzoyl peroxide) other than the high temperature peroxides included in the monomer feed. The additional peroxide decomposes at a lower temperature than the other peroxides.

A low temperature peroxide [defined herein as the temperature at which the half life of the peroxide equals 10 hours] has a half life temperature of less than about 90° C., typically about 62°–85° C., a medium temperature peroxide has a half life temperature above about 90° C., typically in the range of about 91°–105° C., and a high temperature peroxide has a half life temperature above about 105° C.

DETAILED DESCRIPTION OF THE PREFERRED EMBODIMENTS

Figure 1:
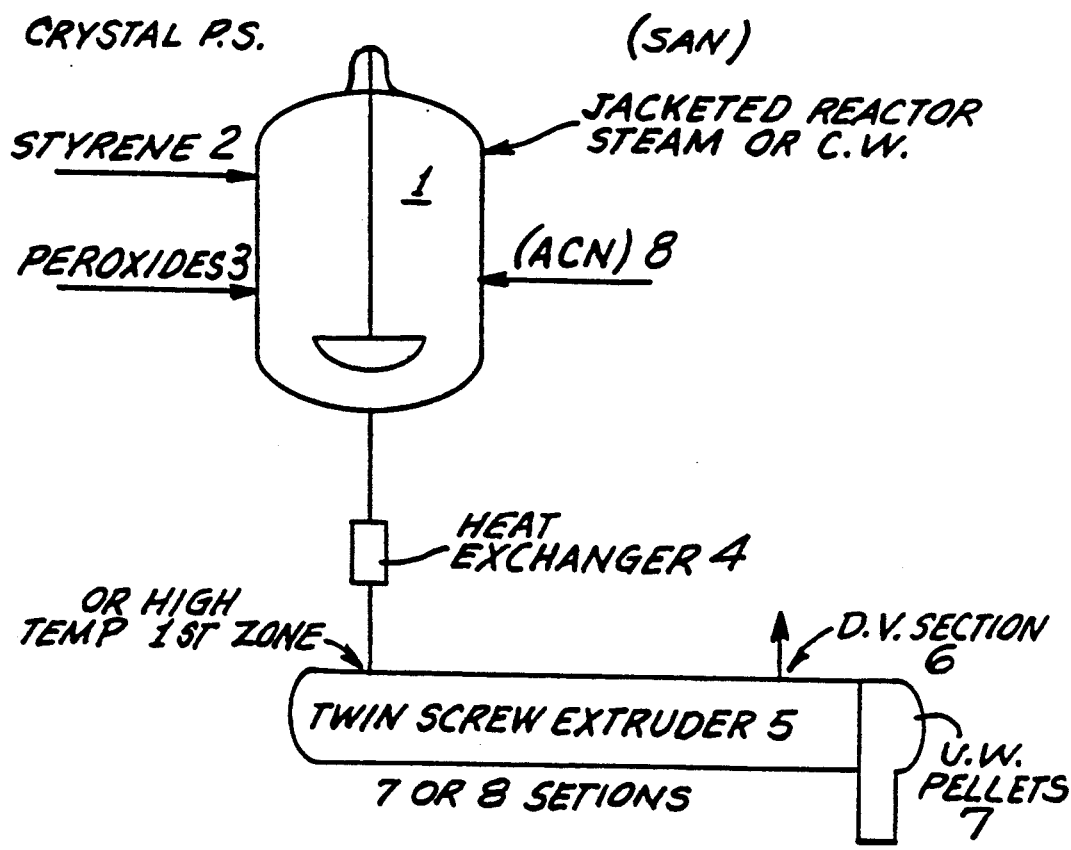
FIG. 1 is a flow diagram for a polystyrene or a styrene copolymer (e.g. SAN) process. Styrene enters a prepolymerizer (1) continuously through line (2) while mixed peroxides are added continuously through line (3). Prepolymer exits the prepolymerizer (1) through a heat exchanger (4) into an extruder-reactor (5), then into a devolatilization zone (6), and optionally into a pelletizer (7). When preparing styrene copolymers, the comonomer (e.g., acrylonitrile) is added to the prepolymerizer through line (8) and thereafter the process flow diagram is the same.
Figure 2:
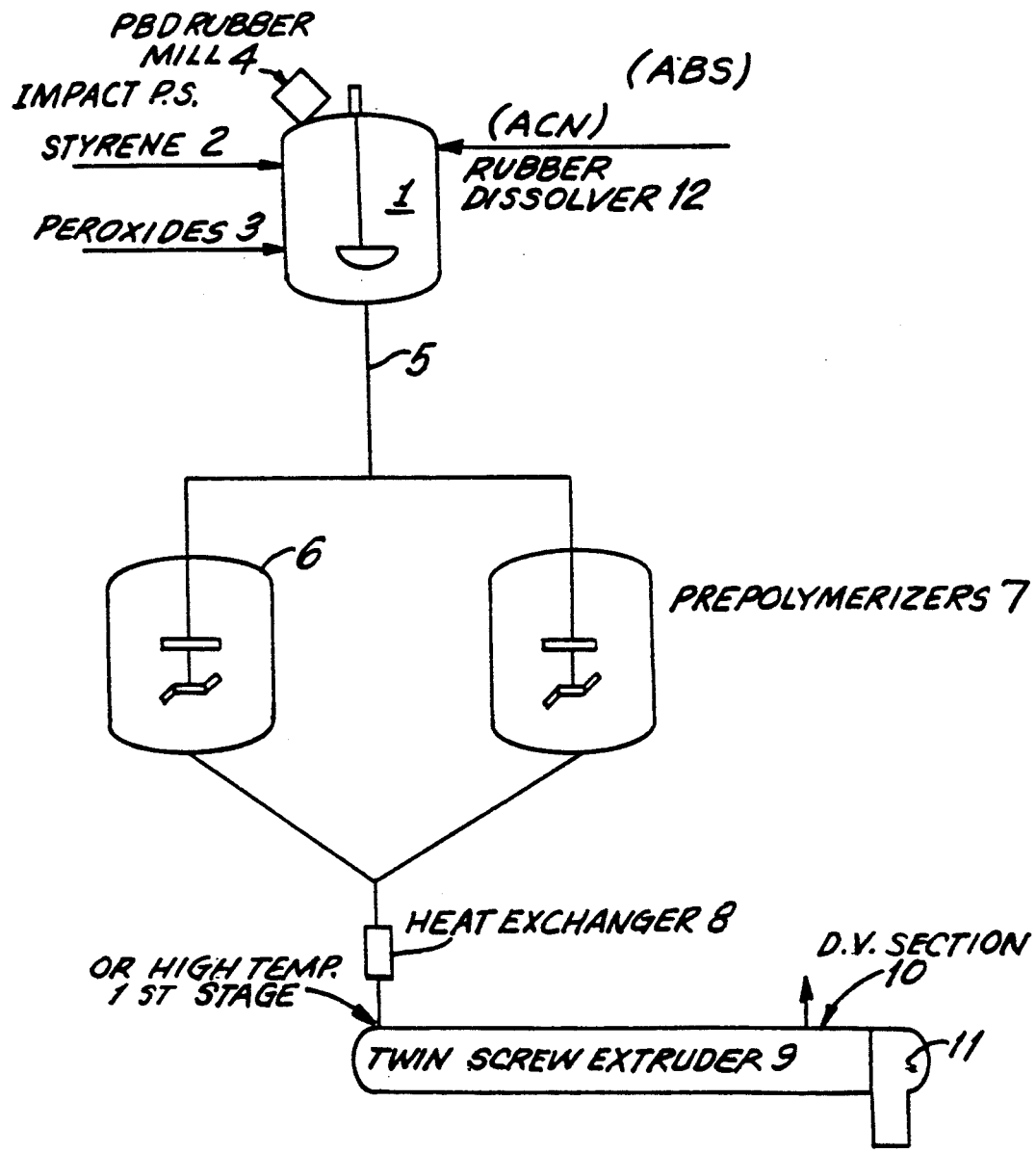
FIG. 2 is a flow diagram of a impact polystyrene or an acrylonitrile-butadiene-styrene (ABS) process. Styrene enters a rubber dissolver (1) via line (2) and mixed peroxides are introduced via line (3). Rubber is added through a rubber grinder (4). Rubber dissolved in styrene and containing mixed peroxides exits the dissolver (1) through line (5) and is distributed to either prepolymerizer (6) or (7). The prepolymer exits through a heat exchanger (8) into an extruder-reactor (9), then into a devolatilization zone (10), and optionally into a pelletizer (11). When ABS is prepared, acrylonitrile is added to the dissolver (1) through line (12) and thereafter the process flow diagram is the same.

In the above processes, the reactor is preferably a stirred reactor. When a rubber is used for impact modification the reactor must be a stirred reactor. In the above processes, a feed of styrene monomer, or of a 5-10 weight % solution of a rubber in styrene monomer, or of styrene and acrylonitrile monomers is fed to a stirred reactor, which is stirred at high shear for the rubber solutions. Optionally, the monomer(s) or monomer-rubber solutions contains 0.02–0.5 wt. % of an organic mercaptan, e.g., t-dodecyl mercaptan, for control of the rubber particle size and polymer chain length. A stream containing a liquid mixture of high temperature peroxides is also added to the reactor.

The high temperature peroxides are selected so that very little decomposition occurs at the prepolymerization temperature but so that full decomposition of the peroxides and initiation of polymerization occurs at the temperatures maintained in the second polymerization zone (e.g., the extruder-reactor). The mole ratios of peroxides in the mixture are selected such that the concentration of the peroxide with the lowest decomposition temperature is much higher than that of the peroxide with the highest decomposition temperature. For example, the mole ratio in progressing from the peroxide with the lowest decomposition temperature to the peroxide with the highest decomposition temperature may be 2:1:0.5:0.25. The peroxide mixtures (and mole ratios) are designed to give a smooth temperature exotherm in the second polymerization zone (i.e., extruder reactor). Some typical high temperature peroxides which can be employed in this process are t-butyl peracetate, t-butyl peroxide, dicumyl peroxide, t-butyl peroctoate, t-butyl hydroperoxide, di-t-butyl peroxide, and the like.

Typically, the stirred reactor (i.e., prepolymerizer) is maintained at a temperature of about 200° F. to about 270° F. The residence time in the stirred reactor is about 1 to about 3 hours. The time should be sufficient to allow approximately 20–40% conversion of the monomer(s) to prepolymer. It is also important that the conversion be in this range when prepolymerizing rubber solutions, as in the case of impact polystyrene or acrylonitrile-butadiene-rubber (ABS), since phase inversion to give discrete rubber particles in the prepolymer occurs at 20-30% conversion. The rubber particle size is dependent on the shear imparted to the prepolymer solution. In the case of ABS, the prepolymer solutions are very viscous and it is imperative that high shear be imparted to the reaction mixture so that small rubber particles are obtained in the prepolymer solution.

Dual addition of mercaptan can be used with impact polystyrene or acrylonitrile-butadiene-styrene (ABS). The first addition can be used to slightly reduce the molecular weight so that high initial viscosities are attained for the prepolymer to be sheared. Then, after the prepolymer particle size is set, the molecular weight of the finished polymer can be lowered by a second mercaptan addition. When the prepolymer reaches the proper conversion, it is passed through a heating zone where the high temperature peroxides start to decompose, initiating free radical polymerization as the prepolymer mixture enters the second reactor zone (e.g., twin screw extruder). The mixture of peroxides is selected so that there is an increasing decomposition temperature for a selected length of half-life, thus providing a somewhat constant source of free radicals as the temperature in the second reactor zone (e.g., twin screw extruder) rises due to the heat of polymerization. The concentration of free radicals is selected so that the polymerization rate is very rapid and the prepolymerization is essentially complete before the mixture enters the devolatilization zone (e.g., the final zone of the twin screw extruder). Cooling is provided in the second reactor zone to remove some of the heat of polymerization. In the devolatilization zone, any residual monomer(s) are removed so that the resulting polymer or copolymer is essentially monomer-free.

Antioxidants and stabilizers may be added to the finished polymer at the devolatilization zone where the pressure profile of the extruder is low.

The present invention eliminates the problems involved in polymerizing or copolymerizing styrene in an extruder by carrying out the polymerization in two stages. In the first stage, the styrene is heated in a prepolymerization reactor to temperature high enough to cause an appreciable rate of thermal polymerization to occur per unit time. The temperature is selected so that the heat load due to the heat of polymerization will essentially balance the reactor cooling capacity plus the sensible heat needed to raise the styrene from ambient temperature to polymerization temperature. This temperature is in the range of about 200°-270° F., which will give a polymerization rate of about 18-26% per hour. The residence time is selected so that prepolymerization of about 20-40% of the styrene monomer takes place. In a preferred embodiment, this prepolymer is then pumped or fed by gravity to a twin screw extruder equipped with a devolatilization zone where the temperature is raised from about 250° F. to about 500°-600° F. to complete the polymerization and to remove any residual monomer.

In second stage, the polymerization is catalyzed by the high temperature peroxide initiators added to the styrene monomer before the prepolymerization is started. It is important that the type and amount of each peroxide initiator be selected so that a smooth rise in temperature occurs down the length of the extruder-reactor and so that there is not an uncontrollable, runaway reaction. In an alternate embodiment, the peroxide mixture is added to the prepolymer as it exits the prepolymerization zone before entering the reactor.

Thus, the first or prepolymerization stage is mainly a thermal polymerization, whereas the polymerization in the second stage (i.e.,extruder) is a peroxide initiated polymerization. The initiators added are mainly high temperature peroxides which are selected so that, as the prepolymer leaves the prepolymerization reactor at about 200°-270° F. and enters the first zone of the extruder where the prepolymer temperature is increased, the initiator mixture starts to decompose. The free radicals formed by the decomposition of the initiators further accelerate the polymerization and increase the temperature in the extruder due to the heat of polymerization. The multiple initiator systems are selected so that as the temperature rises, each individual initiator will in turn decompose, forming free radicals which will further accelerate the polymerization and cause the temperature to increase still further. The initial increase in temperature from the prepolymerizer can be accomplished by several methods, for example, by using a small heat exchanger before the extruder, by heating the extruder throat, by injecting a small amount of low temperature peroxide into the prepolymer as it exits the first reactor, or by heating the first zone of the twin screw extruder. A time-temperature profile of the two stage process is shown in FIG. 1.

Thus, the styrene monomer (preferably containing the mixed peroxide initiator system) is added at a rate sufficient to maintain the temperature in the prepolymerization reactor at about 200°-270° F. with full jacket and/or internal cooling. The incoming styrene monomer is at or below ambient temperature. The prepolymer mixture (which contains initiators) is at about 200° to about 270° F. as it is fed to an extruder, preferably a twin screw extruder. The extruder is set for full cooling after the first zone. If necessary, the first zone is heated to bring the temperature of the prepolymer-peroxide mixture to above 250° F. so that the peroxide initiators start to decompose and produce free radicals which in turn cause further polymerization of the styrene. This further polymerization raises the temperature of the prepolymer mixture, causing more free radicals to be formed and thus initiating further polymerization.

By proper selection of the type and concentration of the initiators, a rapid temperature rise and high polymerization rate is obtained in the extruder. The rapid temperature rise from about 250° F. to 500°-600° F., due to the heat of polymerization, is partially controlled by heat removal in the extruder's cooling zones. This cooling is used to balance the heat load so that the polymerization in the extruder can be controlled.

In order to achieve a rapid temperature increase in the feed section of the extruder, a mixture of peroxides with overlapping half lives is employed. For example, a typical initiator system may consist of 10 mole % of a low temperature peroxide (to give some polymerization in the prepolymerization reactor), 50 mole % of a medium temperature peroxide, 25 mole % of a high temperature peroxide, and 15% of an even higher temperature peroxide. The mole percentages can be altered to provide a smooth rise in temperature from about 250° F. to about 500°14 600° F. in the extruder. An initiator system of 5 mole % of a low temperature peroxide, 70 mole % of a mixture of medium temperature peroxides, and 25 mole % of a high temperature peroxide may also be used to obtain a smooth temperature rise in the extruder-reactor.

To achieve smooth polymerization and continuous temperature increases more than one peroxide of a certain class can be included in the mixed initiator system. For example, a particularly good combination of initiators is benzoyl peroxide (low temperature), t-butyl peracetate and t-butyl perbenzoate (high temperature) and di-t-butyl peroxide (higher temperature). If there is appreciable decomposition of the low temperature initiator in the prepolymerization reactor, then its concentration can be reduced or a higher temperature peroxide can be substituted in the initiator mixture. The concentration of the initiator system and the relative amounts of each individual peroxide are adjusted to give a smooth polymerization and to provide temperature increases to a peak temperature of about 550° F. before lack of polymerization and cooling in the twin screw extruder causes the temperature to decrease from the maximum. Selection of the proper mixture of peroxides also insures very low residual monomer in the product.

The twin screw extruder is arranged so that the feed throat and/or the first zone can be heated. The reaction rate and the temperature of the prepolymer are thus increased markedly. The downstream zones of the extruder are cooled to their maximum capacity to remove the heat generated during the polymerization. The next to last zone of the extruder is a devolatilization zone. The number of zones in the twin screw extruder may be varied depending on the need for heat removal and devolatilization. In a preferred embodiment, the last zone is a pressurizing zone to build up pressure for passage of the molten polymer through a pelletizing die. A melt pump may be used in place of, or in addition to, this last zone. The polystyrene is then either stranded and cut or cut under water and dried.

In the prepolymerization stage, a small amount of a low temperature peroxide, e.g., benzoyl peroxide or t-butyl peroctoate, may be added to the prepolymer to accelerate the rate of polymerization and to control the molecular weight. Alternately, a chain terminating agent, e.g., t-dodecyl mercaptan, may be added to the prepolymerization mixture as a molecular weight control agent.

In a similar manner, impact polystyrene or acrylonitrile-butadiene-styrene (ABS) copolymer is prepared. A rubber, e.g., cis-polybutadiene, is added to the styrene monomer or styrene-acrylonitrile monomer and the prepolymerization is carried out until phase inversion occurs. The polymerization is then finished in a twin screw extruder. In the case of ABS polymerization, the twin screw extruder will help to divide and disperse the rubber particles. The twin screw extruder can also be used to blend a latex derived ABS concentrate into the polymer to enhance the impact properties.

The following examples are intended to illustrate but not limit the scope of the invention:

EXAMPLE 1

A feed of styrene monomer containing 2100 ppm of an initial system of mixed high temperature peroxides consisting of 700 ppm t-butyl perbenzoate, 700 ppm dicumyl peroxide, and 700 ppm t-butyl peroxide is prepared. The feed at 80° F. is added to a 2000 gallon jacketed, stirred stainless steel reactor maintained at 250° F. The feed is supplied at a rate of 17,600 pounds per hour. Under these conditions, the heat load for this vessel is 17,600 (250–80) 0.45 = 1,346,400 BTU per hour and the conversion (thermal polymerization) to prepolymer is 26.4%. At this reactor temperature, it is possible to transfer about 8500 BTU per square foot of reactor cooling surface per hour.

The resulting prepolymer is then passed, without cooling, into a twin screw Berstorff ZE180. The first zone of the extruder is heated to initiate further polymerization. The subsequent zones of the extruder are cooled. In the extruder, the sensible heat absorbed in raising the polymer melt temperature plus the additional cooling capacity of 1,111,111 BTU of the Berstorf ZE180 is used to balance the heat of polymerization liberated, namely 17,600 (575–250) 0.45 = 2,574,000 BTU. A devolatilization zone is provided in the extruder to remove any residual monomer. The polymer is then pelletized and dried.

The conversions and heat loads for each part of the process are:

| Unit Process | BTU/Hour | Equivalent Conversion |
|---|---|---|
| Prepolymerization | 1,346,400 | 26.4% |
| Extruder Polymerization | 2,574,000 | 50.6% |
| Extruder Cooling | 1,111,111 | 21.8% |
| TOTAL | 5,031,511 | 98.8 |

The heat load at 100% conversion is (17,600×289) = 5,086,400.

Thus, essentially all of the heat load from this process is handled without using any jacket heat removal in the prepolymerization stage. This gives considerable latitude for adjustment of conversion levels between the prepolymerization stage and the final polymerization stage in the extruder.

EXAMPLES 2 to 5

In these examples, a syrup was prepared by dissolving 33% of Dow 685 polystyrene in styrene monomer in order to provide a polystyrene prepolymer. To this syrup was added the indicated amounts of various high temperature peroxides. A total of 45 g. of this syrup-peroxide mixture was then added to a Braebender Plastograph operating at 150° C., 50 rpm, and a sensitivity setting of 0.5. The Plastograph was used to simulate the second stage of the polymerization process, i.e., polymerization in the extruder. The polymerization was allowed to proceed adiabatically until the peak temperature was reached. Polystyrene was recovered from the chamber.

| Peroxide Type and Amount (ppm by weight based on mixture) | Example No. | | | |
|---|---|---|---|---|
| | 2 | 3 | 4 | 5 |
| t-butyl perbenzoate | 500 | 1000 | 1500 | 1500 |
| dicumyl peroxide | 500 | 500 | — | 1500 |
| t-butyl peroxide | 500 | 1000 | 1500 | 1500 |
| t-butyl hydroperoxide | — | — | 1500 | —, |
| Total of Mixed Peroxides (ppm) | 1500 | 2500 | 4500 | 4500 |
| Time (minutes) | 20 | ·9 | 8 | 6 |
| Peak Temperature (°C.) | 160 | 162 | 158 | 165 |
| Torque | 50→230 | * | * | * |
| Polymer product (grams) | — | 38 | 31 | 32.5 |
| Styrene conversion (grams) | 98.5 | — | — | — |
| Monomer loss (grams) | 0.68 | 7 | 14 | 12.5 |

*Torque could not be measured due to rapid reaction and loss of styrene monomer.

Even though the Braebender Plastograph was not pressure-tight and monomer tended to boil off from the chamber due to the high polymerization rates and temperatures (except in Example 2), these runs demonstrated that high polymerization rates and complete conversion can be achieved in an extruder-reactor in short time periods.

EXAMPLES 6 AND 7

Using the procedure described in Example 1, a feed of acrylonitrile is also added to the reactor at a rate sufficient to provide a 75/25 or 72/28 copolymer of styrene and acrylonitrile. The mixture is prepolymerized at a slightly lower temperature (200°-230° F.) due to the higher rate of polymerization that results when acrylonitrile is present. The type and amount of peroxide should be adjusted to 1800 ppm total peroxide (600/600/600 ppm of the peroxides used in Example 1). This adjustment accounts for the higher rate of polymerization in the extruder due to the presence of acrylonitrile.

The resulting styrene-acrylonitrile copolymer should be a high molecular weight polymer suitable for injection molding and extrusion applications.

EXAMPLE 8

A total of 2640 pounds of Firestone's Diene 55 (a cis-polybutadiene rubber) is chopped in a rubber grinder and added to a vessel suitable for dissolving rubber. The vessel contains 50,160 pounds of styrene monomer and 0.27 wt % based on the monomer, of a mixture of the high temperature peroxides used in Example 1 (in equal portions). The monomer-rubber-peroxide mixture is slowly agitated with mild heating until the rubber is dissolved in the styrene monomer. The solution is then added to a prepolymerization vessel which is equipped with cooling coils and a high speed, high horsepower, multiple bladed agitator system. t-Dodecyl mercaptan is added to the solution to control the prepolymer solution viscosity. The mixture is thermally polymerized for several hours at 200°-250° F. until a phase inversion occurs and discrete rubber particles appear in the prepolymer. This inversion usually occurs at about 20-25% conversion and it can be followed by a polarized optical microscope. At this point, the prepolymer agitator is slowed and additional t-dodecyl mercaptan is added to control the final molecular weight of the polymer. The mixture is then fed to a heating zone in a twin screw extruder-reactor where the higher temperature peroxides start to decompose, thus initiating free radical polymerization. The heat of polymerization, although partially removed in the extruder, causes the temperature of the polymer melt to increase. The increased temperature causes more peroxide to decompose and the polymerization rate to increase, which leads to a further temperature rise. The temperature in the extruder-reactor rises from about 200°-230° F. to about 500°-600° F. as the prepolymer mixture progresses down the length of the extruder. After the polymerization is complete, the polymer is transported into a low pressure devolatilization zone in the extruder. In this zone, vacuum is applied to remove residual monomer which is recycled to the vessel used for the prepolymerization. The viscous polymer melt is extruded and cut into solid pellets.

The resulting polymer should have an Izod impact strength above 1.5 ft-lbs. per inch and a tensile strength above 2500 psi.

EXAMPLE 9

Using the procedure described in Example 8, 10% by weight of Firestone Rubber Co. Diene 35 (a cis-polybutadiene rubber) is dissolved in a styrene/acrylonitrile monomer mixture (75/25) along with 0.24% by weight, based on monomer, of a mixture of high temperature peroxides (800/800/800 ppm of the peroxides used in Example 1). The mixture is prepolymerized at 200°-220° F. The mixture is agitated at a very high shear rate. The polymer viscosity and shear rate during agitation are critical and affect the resulting polymer properties. Dual addition of about t-dodecyl mercaptan allows prepolymerization at the proper polymer viscosity for optimum rubber particle size (1st addition) and control of the ultimate polymer molecular weight (2nd addition). After phase inversion and the desired rubber particle size in the prepolymer is attained, the agitator speed is lowered while the prepolymer is being fed to the extruder-reactor at a rate consistent with the extruder production rate. Devolatilization and pelletizing are then carried out.

The finished polymer should have a high molecular weight, a tensile strength in excess of 4500 psi, and an Izod impact strength in excess of 4.0 ft-lbs. per inch.

EXAMPLE 10

The polymer prepared in Example 9 is post-blended with 10 wt% of a small particle size latex-derived ABS concentrate (Marbon-General Electric Blendex resin). The blending is carried out in a Bonbury mixer or twin screw extruder. Most of the properties remain the same, but the Izod impact strength of the blend should increase to the 7-8 ft-lbs. per inch range.

While this invention has been described with preferred embodiments, it is to be understood that variations and modifications may be resorted to as will be apparent to those skilled in the art. Such variations and modifications are considered within the purview and scope of the claims appended hereto.

What is claimed is:

1. A two-stage process for the preparation of crystal polystyrene, the first stage being conversion of styrene monomer to a prepolymer and the second stage being conversion of the prepolymer to polymer, which comprises the steps of:

(a) forming a mixture by feeding (i) the styrene monomer, (ii) an initiator system consisting essentially of a mixture of various high temperature peroxides having different decomposition temperatures in different amounts but in a total amount effective to convert the prepolymer to the polymer, with the peroxide having the lowest decomposition temperature being present in the largest amount, with the peroxide having the highest decomposition temperature being present in the lowest amount, and with the different amounts being selected so that the mole ratios of the various peroxides successively decrease as the decomposition temperatures of the various peroxides successively increase, and optionally (iii) one or more organic mercaptans to a reactor;

(b) prepolymerizing the styrene monomer in the mixture in the reactor at a temperature sufficient at which very little decomposition of the peroxides occurs, and for a residence time sufficient to convert about 20 to about 40% of the monomer to prepolymer and form a prepolymer mixture;

(c) heating the prepolymer mixture exiting from the reactor to raise the prepolymer mixture's temperature to a point at which the peroxides begin to fully decompose;

(d) transporting the heated prepolymer mixture through a cooled extruder at a rate which allows the peroxides to successively decompose whereby a smooth temperature exotherm due to the heat of polymerization is achieved and the prepolymer is substantially completely converted to the polymer and forms a polymer mixture;

(e) transporting the polymer mixture into a devolatilization zone in the extruder; and (f) removing any residual monomer from the polymer mixture in the devolatilization zone of the extruder.

2. The process of claim 1, wherein the mixture of high temperature peroxides consists of combinations of peroxides selected from the group consisting of t-butyl perbenzoate, di-cumyl peroxide, t-butyl peroxide, t-butyl hydroperoxide, t-butyl peroctoate, t-butyl peracetate, and di-t-butyl peroxide; and wherein in step (b), the prepolymerization is a thermal prepolymerization with the temperature being about 200° to about 270° F. and the residence time being about 1 to about 3 hours; and wherein the extruder is a twin screw extruder having a heating zone, one or more cooling zones, and a devolatization zone.

3. The process of claim 2, wherein one or more organic mercaptans are present; and wherein the temperature in step (b) is about 220° to about 260° F. and the residence time is about 1.5 to about 2.5 hours.

4. The process of claim 1, wherein the prepolymerization is a peroxide-initiated prepolymerization and in step (a) a low temperature peroxide is fed to the stirred reactor.

5. The process of claim 1, wherein the heating of step (c) is carried out in a heat exchanger, a heated throat in an extruder, or a heated first zone of an extruder or is effected by adding a small amount of a low temperature peroxide to the prepolymer mixture.

6. A two-stage process for the preparation of impact polystyrene, the first stage being conversion of styrene to a prepolymer and the second stage being conversion of the a cooled extruder at a rate which allows the peroxides to successively decompose whereby a smooth temperature exotherm due to the heat of polymerization is achieved and the prepolymer is substantially polymerized to polymer, forming a polymer mixture;

(e) transporting the polymer mixture into a devolatilization zone; and (f) removing any residual monomer from the polymer mixture in the devolatilization zone of the extruder.

7. The process of claim 6, wherein the rubber is a high cis-polybutadiene rubber; wherein the initiator system consists of combinations of peroxides selected from the group consisting of t-butyl perbenzoate, di-cumyl peroxide, t-butyl peroxide, t-butyl hydroperoxide, t-butyl peroctoate, t-butyl peracetate, and di-t-butyl peroxide; wherein in step (b) the temperature is about 200° to 270° F. and the residence time is about 1 hour to about 3 hours; and wherein the extruder is a twin screw extruder having a heating zone, one or more cooling zones, and a devolatization zone.

8. The process of claim 7, wherein one or more organic mercaptans are present; and wherein the temperature in step (b) is about 220° to about 240° F. and the residence time is about 1.5 hour to about 2.5 hours.

9. The process of claim 6, wherein in step (a) a low temperature peroxide is fed to the stirred reactor.

10. The process of claim 6, wherein the heating of step (c) is carried out in a heat exchanger, a heated throat in an extruder, or a heated first zone of an extruder or is effected by adding a small amount of a low temperature peroxide to the prepolymer mixture.

11. A two-stage process for the preparation of a styrene copolymer the first stage being conversion of styrene monomer and a comonomer to a prepolymer and the second stage being conversion of the prepolymer to the copolymer, which comprises the steps of:

(a) forming a mixture by feeding (i) styrene monomer, (ii) the comonomer, an initiator system consisting essentially of a mixture of various high temperature peroxides having different decomposition temperatures in different amounts but in a total amount effective to convert the prepolymer to the copolymer, with the peroxide having the lowest decomposition temperature being present in the largest amount, with the peroxide having the highest decomposition temperature being present in the lowest amount, and with the different amounts being selected so that the mole ratios of the various peroxides successively decrease as the decomposition temperatures of the various peroxides successively increase, and optionally (iii) one or more organic mercaptans to a reactor;

(b) prepolymerizing the monomers in the mixture in the reactor at a temperature sufficient to initiate and maintain polymerization, but at a temperature at which very little decomposition of the peroxides occurs, and for a residence time sufficient to convert about 20 to about 40% of the monomers to prepolymer and form a prepolymer mixture;

(c) passing the prepolymer mixture exiting from the reactor through a heating zone to raise the prepolymer mixture's temperature to a point at which the peroxides begin to fully decompose;

(d) transporting the heated prepolymer mixture through a cooled extruder at a rate which allows the peroxides to successively decompose whereby a smooth temperature exotherm due to the heat of polymerization is achieved and the prepolymer is substantially completely converted to the copolymer and forms a copolymer mixture;

(e) transporting the copolymer mixture into a devolatilization zone; and (f) removing any residual monomers from the copolymer mixture in the devolatilization zone of the extruder.

12. The process of claim 11, wherein the the mixture of high temperature peroxides consists of combinations of peroxides selected from the group consisting of t-butyl perbenzoate, di-cumyl peroxide, t-butyl peroxide, t-butyl hydroperoxide, t-butyl peroctoate, t-butyl peracetate, and di-t-butyl peroxide; wherein in step (b) the prepolymerization is a thermal prepolymerization with the temperature being about 200° to about 270° F. and the residence time being about 1 to about 3 hours; and wherein the extruder is a twin screw extruder having a heating zone, one or more cooling zones, and a devolatization zone.

13. The process of claim 12, wherein the mercaptan is present and the mercaptan is t-dodecyl mercaptan; and wherein the temperature in step (b) is about 200° to about 230° F. and the residence time is about 1.5 to about 2.5 hours.

14. The process of claim 11, wherein the prepolymerization is a peroxide-initiated prepolymerization and in step (a) a low temperature peroxide is fed to the stirred reactor.

15. The process of claim 11,, wherein the heating of step (c) is carried out in a heat exchanger, a heated throat in an extruder, or a heated first zone of an extruder or is effected by adding a small amount of a low temperature peroxide to the prepolymer.

16. The process of claim 11, wherein the comonomer is alpha methyl styrene, methyl methacrylate, acrylonitrile, maleic anhydride or acrylic acid.

17. A two-stage process for the preparation of an acrylonitrile-unsaturated rubber-styrene graft copolymer, the first stage being conversion of the monomers to a prepolymer and the second stage being conversion of the prepolymer to polymer, which comprises the steps of:
  (a) preparing a mixture by feeding a solution of an unsaturated rubber dissolved in styrene monomer and acrylonitrile monomer, an initiator system consisting of a mixture of high temperature peroxides having different decomposition temperatures in different amounts but in a total amount effective to convert the prepolymer to the polymer, with the peroxide having the lowest decomposition temperature being present in the largest amount, with the peroxide having the highest decomposition temperature being present in the lowest amount, and with the different amounts being selected so that the mole ratios of the various peroxides successively decrease as the decomposition temperatures of the various peroxides successively increase, and optionally one or more organic mercaptans to a stirred reactor;
  (b) prepolymerizing the mixture in the stirred reactor at a temperature sufficient to initiate and maintain polymerization but at a temperature at which very little decomposition of the peroxides occurs, and for a residence time sufficient to convert about 20 to about 40% of the monomers to prepolymer, forming a prepolymer mixture;
  (c) passing the prepolymer mixture from the stirred reactor through a heating zone to raise the prepolymer mixture's temperature to a point at which the mixed peroxides begin to fully decompose;
  (d) transporting the heated prepolymer mixture through an extruder at a rate which allows the peroxides to successively decompose whereby a smooth temperature exotherm due to the heat of polymerization is achieved and the prepolymer is substantially completely polymerized, forming a polymer mixture;
  () transporting the polymer mixture into a devolatilization zone in the extruder; and
  (f) removing any residual monomer from the polymer mixture in the devolatilization zone.

18. The process of claim 17, wherein the unsaturated rubber is high cis-polybutadiene; wherein the initiator system consists of combinations of peroxides selected from the group consisting of t-butyl perbenzoate, dicumyl peroxide, t-butyl peroxide, t-butyl hydroperoxide, t-butyl peroctoate, t-butyl peracetate, and di-t-butyl peroxide; wherein in step (b) the temperature is about 200° to about 270° F. and the residence time is about 1 hour to about 3 hours; and wherein the extruder is a twin screw extruder having a heating zone, one or more cooling zones, and a devolatization zone.

19. The process of claim 18, wherein the mercaptan is present and the mercaptan is t-dodecyl mercaptan; and wherein the temperature in step (b) is about 210° to about 230° F. and the residence time is about 1.5 hours to about 2.5 hours.

20. The process of claim 19, wherein the heating of step (c) is carried out in a heat exchanger, a heated throat in an extruder, or a heated first zone of an extruder or is effected by adding a small amount of a low temperature peroxide to the prepolymer.

21. A two-stage process for the preparation of a styrene polymer, the first stage being conversion of styrene monomer and any optional comonomer, any optional rubber, and/or any optional unsaturated rubber to a prepolymer and the second stage being conversion of the prepolymer to polymer, which comprises the steps of:
  (a) forming a mixture by feeding (i) the styrene monomer, (ii) an initiator system consisting essentially of a mixture of various high temperature peroxides having different decomposition temperatures in different amounts but in a total amount effective to convert the prepolymer to polymer, with the peroxide having the lowest decomposition temperature being present in the largest amount, with the peroxide having the highest decomposition temperature being present in the lowest amount, and with the different amounts being selected so that the mole ratios of the various peroxides successively decrease as the decomposition temperatures of the various peroxides successively increase, and optionally (iii) the comonomer, (iv) the rubber, (v) the unsaturated rubber, and/or (vi) one or more organic mercaptans to a reactor, with the reactor being a stirred reactor if the rubber or the unsaturated rubber is present in the mixture;
  (b) prepolymerizing the monomer or monomers in the mixture in the reactor at a temperature sufficient to initiate and maintain polymerization, but at a temperature at which very little decomposition of the peroxides occurs the lowest decomposition temperature, and for a residence time sufficient to convert about 20 to about 40% of the monomer or monomers to prepolymer and form a prepolymer mixture;
  (c) heating the prepolymer mixture exiting from the reactor to raise the prepolymer mixture's temperature to a point at which the peroxides begin to fully decompose;
  (d) transporting the heated prepolymer mixture through a cooled extruder at a rate which allows the peroxides to successively decompose whereby a smooth temperature exotherm due to the heat of polymerization is achieved and the prepolymer is substantially completely converted to the polymer and forms a polymer mixture;
  (e) transporting the polymer mixture into a devolatilization zone in the extruder; and
  (f) removing any residual monomer or monomers from the polymer mixture in the devolatilization zone of the extruder.

22. The process of claim 1, wherein the temperature in the devolatization zone is raised to about 500°–600° F.

23. The process of claim 11, wherein the temperature in the devolatization zone is raised to about 500°–600° F.

24. The process of claim 1, further comprising the step (g) of transporting the devolatized polymer through a pressurizing zone in the extruder and passing the polymer through a pelletizing die.

25. The process of claim 11, further comprising the step (g) of transporting the devolatized polymer through a pressurizing zone in the extruder and passing the polymer through a pelletizing die.

26. A two-stage process for the preparation of a styrene polymer, the first stage being the conversion of styrene monomer and any optional comonomer, any optional rubber, and/or any optional unsaturated rubber to a prepolymer and the second stage being conversion of the prepolymer to polymer, which comprises the steps of:

(a) feeding (i) the styrene monomer and optionally (ii) the comonomer, (iii) the rubber, (iv) the unsaturated rubber and/or (v) one or more organic mercaptans to a reactor, with the reactor being a stirred reactor if the rubber or the unsaturated rubber is present;

(b) prepolymerizing the monomer or monomers in the reactor at a temperature sufficient to initiate and maintain polymerization and for a residence time sufficient to convert about 20 to about 40% of the monomer or monomers to the prepolymer;

(c) adding to the prepolymer an initiator system to form a mixture of the prepolymer and the initiator system, the initiator system consisting essentially of a mixture of various high temperature peroxides having different decomposition temperatures in different amounts but in a total amount effective to convert the prepolymer to the polymer, with the peroxide having the lowest decomposition temperature being present in the largest amount, with the peroxide having the highest decomposition temperature being present in the lowest amount, and with the different amounts being selected so that the mole ratios of the various peroxides successively decrease as the decomposition temperatures of the various peroxides successively increase;

(d) heating the mixture exiting from the reactor to raise the mixture's temperature to a point at which the peroxides begin to fully decompose;

(e) transporting the heated prepolymer mixture through a cooled extruder at a rate which allows the peroxides to successively decompose whereby a smooth temperature exotherm due to the heat of polymerization is achieved and the prepolymer is substantially completely converted to the polymer and forms a polymer mixture;

(f) transporting the polymer mixture into a devolatilization zone in the extruder; and (g) removing any residual monomer or monomers from the polymer mixture in the devolatilization zone of the extruder.

* * * * *